Patented Mar. 15, 1932

1,849,573

UNITED STATES PATENT OFFICE

JOSEPH GYR, OF BASEL, SWITZERLAND, ASSIGNOR TO SOCIETY OF CHEMICAL INDUSTRY IN BASLE, OF BASEL, SWITZERLAND

DISAZO-DYESTUFFS AND PROCESS OF MAKING SAME

No Drawing. Original application filed January 28, 1930, Serial No. 424,021, and in Switzerland February 2, 1929. Divided and this application filed February 2, 1931. Serial No. 513,054.

This application is divisional of application Serial No. 424,021, filed January 28, 1930.

The present invention relates to the manufacture of new disazo-dyestuffs which are particularly suitable for the production of fast and level blue and grey tints on cotton and viscose. It comprises the process of making the new products, the new products themselves, and the material dyed with the said products.

The manufacture consists in coupling diazo-compounds of the naphthalene series which do not contain other nitrogen containing groups with a product of the general formula

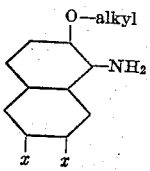

in which $x$ in one case signifies a hydrogen atom and in the other case a hydrogen atom or an $SO_3H$-group, then diazotizing the mono-azo-dyestuff thus obtained and coupling with certain derivatives of the 2-amino-5-hydroxynaphthalene, i. e. compounds of the general formula

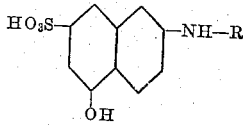

R standing for a hydrogen atom or alkyl or a phenyl or benzyl residue directly bound to the nitrogen atom and free from $NH_2$ groups. The coupling is always performed in an alkaline medium. According to the nature of the diazotized amino-azo-dyestuff the coupling is carried out either in presence of sodium carbonate or in presence of pyridine. A mixture of sodium carbonate and pyridine may also be used. The sodium carbonate may wholly or in part be replaced by another alkali, for example by ammonia. The dyestuffs thus obtained may be converted into new metal derivatives by treatment with agents yielding metals. A similar result is attained by coupling the diazotized mono-azo-dyestuff with the 2-amino-5-hydroxynaphthalene derivative in presence of an agent yielding metal. If there is used as the first diazotizing component one which contains a saponifiable acidyl-group the latter may be removed by treating the finished disazo-dyestuff with a saponifying agent.

The new dyestuffs which correspond with the general formula

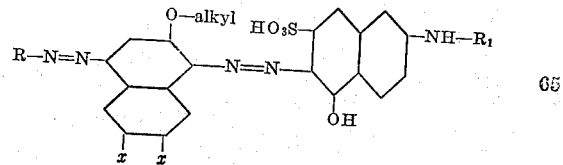

wherein R stands for a residue of a diazotizing component of the naphthalene series containing no other nitrogen containing groups, $x$ in one case stands for a hydrogen atom and in the other for a hydrogen atom or an $SO_3H$ group and $R_1$ for hydrogen or alkyl, or a phenyl or benzyl residue directly bound to the nitrogen atom and free from $NH_2$ groups such as benzyl, methyl, ethyl, phenyl, (methyl)-phenyl, (alkoxy)-phenyl, etc., dye cotton and artificial fibers from regenerated cellulose blue tints which may vary, according to the components selected, from blue to green-blue. Such dyeings may have a remarkable fastness to light; also the property of many of these products to yield very equal tints on the so-called stripey viscose is of value.

The following examples illustrate the invention, the parts being by weight:—

Example 1

30.3 parts of 2-aminonaphthalene-4:8-disulfonic acid are diazotized in the usual manner and the diazo-compound is coupled with a hydrochloric acid solution of 18.7 parts of 1-amino-2-ethoxynaphthalene. When coupling is complete, a solution of 6.9 parts of sodium nitrite is gradually added at 15°–20° C. The diazo-compound of the monoazo-dyestuff is salted out, filtered, washed with saturated common salt solution and introduced gradually into an ice-cold solution of 23.9 parts of 2-amino-5-hydroxynaphthalene-7-sulfonic acid in 100 parts of water and 300 parts of pyridine. When coupling is complete the dyestuff is salted out, filtered, washed with saturated common salt solution and dried. The dyestuff may also be salted out after the pyridine has been separated, for instance by distillation with steam. It corresponds with the formula

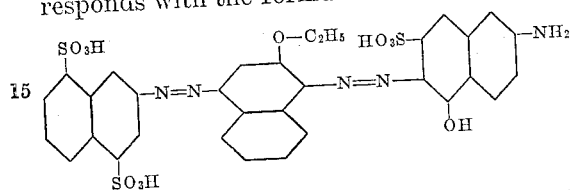

and dyes artificial silk and regenerated cellulose equal blue tints.

The dyestuff obtained according to this example may be converted into a copper compound according to the data of Example 2 of the copending application Serial No. 424,021.

Example 2

47.3 parts of 1-aminonaphthalene-3:6-disulfonic acid-8-hydroxy-4'-toluene-sulfonic acid ester are diazotized in the usual manner at 0° C. with 30 parts of hydrochloric acid of 30 per cent. strength and 6:9 parts of sodium nitrite. The diazo-compound is combined with a solution of 17.3 parts of 1-amino-2-methoxynaphthalene and the necessary quantity of hydrochloric acid. After the coupling is complete the monoazo-dyestuff which has formed is filtered, dissolved in the necessary quantity of an ice-cold caustic soda solution, and further diazotized with 6.9 parts of sodium nitrite and 45 parts of hydrochloric acid of 30 per cent. strength. After an hour the light brown diazo-compound thus formed is separated by addition of common salt and filtered. It is then slowly introduced, while stirring well, into an ice-cold solution of 31.5 parts of 2-phenylaminonaphthalene-5-hydroxy-7-sulfonic acid, 15 parts of sodium carbonate, and 20 parts of technical pyridine in 500 parts of water. After the coupling is complete the blue dyestuff formed is separated by addition of common salt and filtered. It is dissolved in 800 parts of water, treated at 70–73° C. with 60 parts of caustic soda solution of 30 per cent. strength, and kept at this temperature for an hour. To this solution there is slowly added so much hydrochloric acid that the solution has only a very weak alkaline reaction. The dyestuff is separated by addition of common salt. It forms, when dry, a dark powder which dissolves in water to a green-blue solution, dyeing cotton and regenerated cellulose green-blue tints of very good fastness to light.

The procedure is similar with other components. Among compounds whose diazo-compound may advantageously be used as first component may be named aminonaphthalene derivatives which do not contain other nitrogen-containing groups, such as 2-aminonaphthalene-6-sulfonic acid, 2-aminonaphthalene-7-sulfonic acid, 2-aminonaphthalene-4:8-disulfonic acid, 1-aminonaphthalene-4-sulfonic acid or other sulfonic acids deriving from the α- or the β-naphthylamine, further aminonaphtholsulfonic acids the $NH_2$-group of which stands in an α-position of the one six-membered ring, and the OH-group of which stands in an α-position of the other six-membered ring, such as 1-amino-5-hydroxynaphthalene-7-sulfonic acid, 1-amino-8-hydroxynaphthalene-3:6-disulfonic acid, 1-amino-8-hydroxynaphthalene-4:6-disulfonic acid, 1-amino-8-hydroxynaphthalene-4-sulfonic acid, 1-amino-8-hydroxynaphthalene-2:4-disulphonic acid, and the like (preferably in the form of an O-ester), and so on. As suitable middle components may be named the methyl, ethyl, propyl, butyl, etc. ethers of the 1-amino-2-hydroxynaphthalene, or the 6- or 7-sulfonic acids of these products. As suitable end components may be named various (methyl)-phenyl, (dimethyl)-phenyl, (methoxy)-phenyl, N-hydroxyphenyl-, N-hydroxyphenylcarboxylic acids, N-benzyl-, N-alkyl-derivatives of 2-amino-5-hydroxynaphthalene-7-sulfonic acid.

The following table shows the shades of some of the combinations of the present invention:—

| | 1st component | 2nd component | 3rd component | Shade of dyeing |
|---|---|---|---|---|
| I. | 2-aminonaphthalene-6-sulfonic acid | 1-amino-2-methoxy naphthalene-6-sulfonic acid | 2-amino-5-hydroxynaphthalene-7-sulfonic acid | Blue |
| II. | Do. | Do. | 2-phenylamino-5-hydroxynaphthalene-7-sulfonic acid | Greenish-blue |
| III. | 2-aminonaphthalene-8-sulfonic acid | Do. | Do. | Blue |
| IV. | Do. | Do. | 2-amino-5-hydroxynaphthalene-7-sulfonic acid | Do. |
| V. | 2-naphthylamine-4:8-disulfonic acid | 1-amino-2-ethoxynaphthalene | 2-phenylamino-5-hydroxynaphthalene-7-sulfonic acid | Do. |
| VI. | 1-amino-5-hydroxynaphthalene-7-sulfonic acid | 1-amino-2-methoxynaphthalene-6-sulfonic acid | Do. | Greenish-blue |
| VII. | 1-amino-8-hydroxynaphthalene-3:6-disulfonic acid | 1-amino-2-methoxynaphthalene | | Green-blue |

The formula of the dyestuff VI corresponds to the following:—

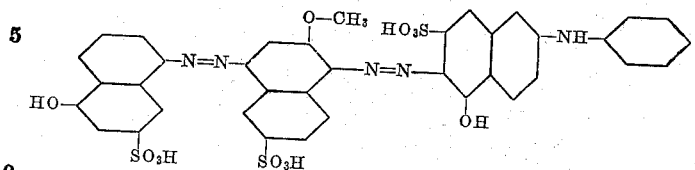

The formula of the dyestuff VII corresponds to the following:—

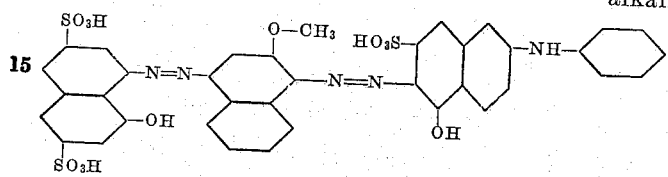

What I claim is:—

1. A manufacture of disazo-dyestuffs dyeing cotton and viscose silk blue to greenish-blue tints, consisting in coupling a diazo-compound of the naphthalene series which contains no other nitrogen containing groups, with a compound of the general formula

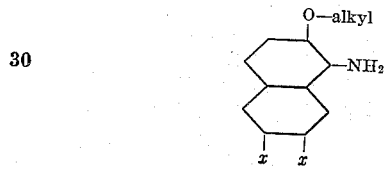

in which $x$ in one case stands for hydrogen and in the other case for $SO_3H$ or hydrogen, diazotizing the monoazo-dyestuff thus obtained and coupling the diazo-compound in an alkaline medium with a compound of the general formula

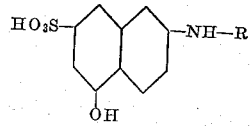

R signifying H, alkyl, or a phenyl or benzyl residue directly bound to the nitrogen atom and free from $NH_2$ groups.

2. A manufacture of disazo-dyestuffs dyeing cotton and viscose silk blue to greenish-blue tints, consisting in coupling a diazotized aryl-sulfonic ester of an 1:8-aminonaphthol-sulfonic acid, with a compound of the general formula

in which $x$ in one case stands for hydrogen and in the other for $SO_3H$ or hydrogen, diazotizing the monoazo-dyestuff thus obtained, coupling the diazo-compound in an alkaline medium with a compound of the general formula

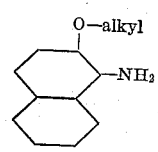

in which R stands for H, alkyl, or a phenyl or benzyl residue directly bound to the nitrogen atom and free from $NH_2$ groups.

3. A manufacture of disazo-dyestuffs dyeing cotton and viscose silk blue to greenish-blue tints, consisting in coupling a diazotized aryl-sulfonic ester of an 1:8-aminonaphthol-sulfonic acid with a compound of the general formula

diazotizing the monoazo-dyestuff thus obtained, coupling the diazo-compound in an alkaline medium with a compound of the general formula

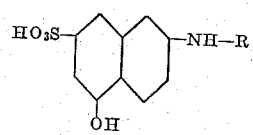

in which R stands for H, alkyl, or a phenyl or benzyl residue directly bound to the nitrogen atom and free from $NH_2$ groups.

4. As new products of manufacture the disazo-dyestuffs corresponding to the general formula

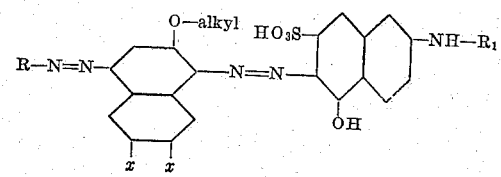

in which R signifies the residue of a diazo-compound of the naphthalene series which contains no other nitrogen-containing groups, $x$ in one case stands for a hydrogen atom and in the other for a hydrogen atom or a sulfo-group, and $R_1$ for H, alkyl, or a phenyl or benzyl residue directly bound to the nitrogen atom and free from $NH_2$ groups, which products from dark powders, dissolving in water to blue to green-blue solutions, and dyeing cotton and viscose silk similar tints.

5. As a new product of manufacture the disazo-dyestuff corresponding to the formula

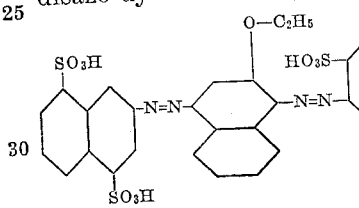

which product forms a dark powder, dissolving in water to blue to green-blue solutions, and dyeing cotton and viscose silk similar tints.

6. As new products of manufacture the disazo-dyestuffs corresponding to the general formula

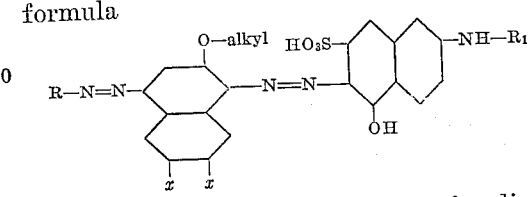

in which R signifies the residue of a diazo-compound of an 1:8-amino-naphthol-sulfonic acid, $x$ in one case stands for a hydrogen atom and in the other for a hydrogen atom or a sulfo-group, and $R_1$ signifying a phenyl residue directly bound to the nitrogen atom and free from $NH_2$ groups, which products form dark powders, dissolving in water to blue to green-blue solutions, and dyeing cotton and viscose silk similar tints.

7. As new products of manufacture the disazo-dyestuffs corresponding to the general formula

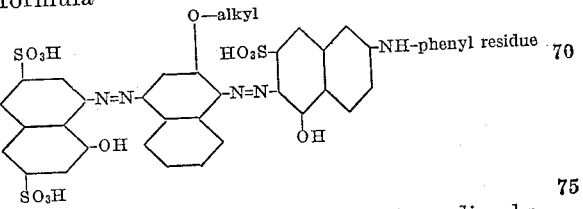

which products form dark powders, dissolving in water to blue to green-blue solutions, and dyeing cotton and viscose silk similar tints.

8. As a new product of manufacture the disazo-dyestuff corresponding to the formula

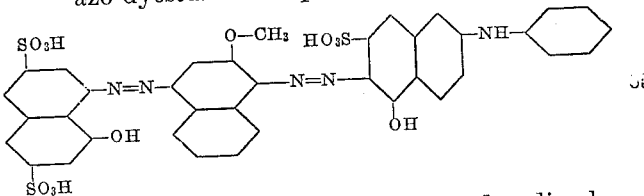

which product forms a dark powder, dissolving in water to blue to green-blue solutions, and dyeing cotton and viscose silk similar tints.

9. As a new product of manufacture the disazo-dyestuff corresponding to the formula

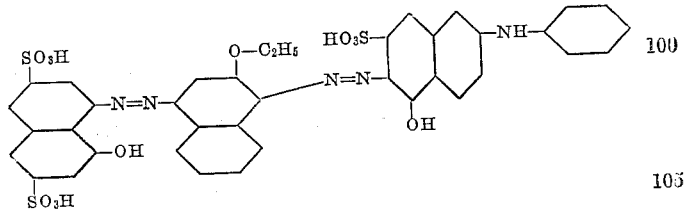

which product forms a dark powder, dissolving in water to blue to green-blue solutions, and dyeing cotton and viscose silk similar tints.

In witness whereof I have hereunto signed my name this 16th day of January, 1931.

JOSEPH GYR.